(12) United States Patent
Teyssedre et al.

(10) Patent No.: US 7,884,039 B2
(45) Date of Patent: Feb. 8, 2011

(54) DARK GREY SODA-LIME-SILICA GLASS COMPOSITION WHICH IS INTENDED FOR THE PRODUCTION OF GLAZING

(75) Inventors: Laurent Teyssedre, Bourg la Reine (FR); Lionel Homo, Coye la Foret (FR)

(73) Assignee: Saint-Gobain Glass France, Courbevoie (FR)

( * ) Notice: Subject to any disclaimer, the term of this patent is extended or adjusted under 35 U.S.C. 154(b) by 1002 days.

(21) Appl. No.: 10/593,329

(22) PCT Filed: Mar. 21, 2005

(86) PCT No.: PCT/FR2005/000697
§ 371 (c)(1), (2), (4) Date: Jan. 18, 2007

(87) PCT Pub. No.: WO2005/095297
PCT Pub. Date: Oct. 13, 2005

(65) Prior Publication Data
US 2007/0191208 A1   Aug. 16, 2007

(30) Foreign Application Priority Data
Mar. 19, 2004   (FR) .................................. 04 02898

(51) Int. Cl.
*C03C 3/087* (2006.01)
(52) U.S. Cl. ........................ 501/71; 501/70; 428/426; 428/432
(58) Field of Classification Search .................. 501/70, 501/71; 428/426, 432
See application file for complete search history.

(56) References Cited

U.S. PATENT DOCUMENTS

| 5,837,629 | A  | * | 11/1998 | Combes et al. ............... 501/70 |
| 6,103,650 | A  | * | 8/2000  | Krumwiede .................. 501/71 |
| 6,274,523 | B1 | * | 8/2001  | Krumwiede et al. .......... 501/71 |
| 6,475,626 | B1 | * | 11/2002 | Stachowiak ................. 428/428 |
| 2001/0025002 | A1 | * | 9/2001 | Krumwiede et al. .......... 501/64 |
| 2004/0171473 | A1 |   | 9/2004 | Teyssedre et al. |
| 2004/0186001 | A1 | * | 9/2004 | Seto et al. ..................... 501/70 |
| 2006/0234849 | A1 |   | 10/2006 | Teyssedre et al. |
| 2006/0240969 | A1 |   | 10/2006 | Teyssedre |

FOREIGN PATENT DOCUMENTS

| EP | 653388 A1 | * | 5/1995 |
| EP | 0 842 906 |   | 5/1998 |
| EP | 0 849 233 |   | 6/1998 |
| JP | 2001 19471 |   | 1/2001 |

* cited by examiner

*Primary Examiner*—Karl E Group
*Assistant Examiner*—Elizabeth A Bolden
(74) *Attorney, Agent, or Firm*—Oblon, Spivak, McClelland, Maier & Neustadt, L.L.P.

(57) ABSTRACT

The invention relates to a dark gray soda-lime silicate glass composition which includes a coloring part essentially consisting of the compounds below in contents varying within the following weight limits:

| $Fe_2O_3$ (total iron) | 0.7 to 0.95% |
| CoO | 50 to 80 ppm |
| NiO | 400 to 700 ppm | or

| $Fe_2O_3$ (total iron) | 0.7 to 0.95% |
| CoO | 200 to 300 ppm |
| NiO | 1500 to 1900 ppm | said composition being free of selenium, having a redox of 0.40 or less, and the glass having a light transmission factor ($T_{LA}$) under illuminant A of 50% or less and an overall energy transmission factor ($T_E$) of less than 45%, these being measured for a thickness of 3.85 mm.

The invention also relates to glass sheets, optionally thermally toughened, obtained from the aforementioned composition and to glazing comprising at least one of these sheets, especially as "privacy" windows for automobiles.

14 Claims, No Drawings

DARK GREY SODA-LIME-SILICA GLASS COMPOSITION WHICH IS INTENDED FOR THE PRODUCTION OF GLAZING

The present application is the U.S. counterpart of WO 05/095297, the text of which is incorporated by reference, which claims as priority French Application No. 04/02898, filed on Mar. 9, 2004, the text of which is incorporated by reference.

The invention relates to a soda-lime silicate glass composition of dark gray color, in particular for producing flat glass by the float process on a bath of molten metal, this glass being intended to form windows for the automobile and building industries. Although more particularly described with reference to automobile applications, the invention is however not limited to this field.

Windows intended for the automobile industry are subjected to various requirements, especially as regards their optical properties. These requirements are governed by regulations, for example as regards the light transmission of a windshield, or they emanate from automobile manufacturers, for example when the aim is to impose a particular color, for esthetic reasons, or energy transmission values for the sake of improving passenger comfort.

The glazing provided for the rear part (side and rear windows) or the roof of an automobile must in particular meet the following requirements: it must have an esthetically pleasing gray color, ensuring good color rendition through the glazing, and possess protective properties with respect to solar radiation, namely a low energy transmission, especially as regards infrared radiation, so as to avoid the greenhouse effect inside the passenger compartment, and a moderate light transmission (less than about 50%) so as to provide users with a feeling of intimacy. Usually, these windows also have a low ultraviolet radiation transmission in order to prevent degradation of the interior furnishings. Such glass is also called "privacy" glass.

Automobile windows made of soda-lime silicate glass are in general manufactured under the "float" process conditions, in which the molten glass floats on a bath of molten metal, usually tin, in order to form a ribbon that is then cut into the form of glass sheets. These sheets may subsequently by bent or undergo a treatment with a view to improving the mechanical properties of the glass, for example a thermal toughening operation.

The level of coloration and the performance requirements indicated above are achieved by the addition of coloring agents into the batch materials intended to be melted in order to produce the soda-lime silicate glass matrix. Many combinations of a relatively large number of coloring agents have been proposed in order to produce gray "privacy" glass.

Glass compositions containing iron, cobalt, nickel and selenium are described in EP-A-947 476, EP-A-1 020 414 and EP-A-1 125 899. The amount of selenium in the glass varies from 0.0008 to 0.0050%.

However, such glass is undesirable owing to the presence of selenium in substantial amount, and the drawbacks that stem therefrom.

Firstly, it is known that selenium exists in the glass in several stable oxidation states, some of which give the glass a particular coloration (relatively intense pink, red or amber). In addition, the final color depends on the nature of the other colorants present in the glass, with which selenium can be combined: for example, $Se^{2-}$ forms a chromophore with the ferric ions, which gives the glass a red-brown coloration. To control the tint therefore requires the redox to be very precisely controlled within a relatively narrow range of values.

Next, the temperature within the furnace in which the glass batch is melted is very much greater than the selenium vaporization temperature. It follows that most of the selenium (about 90%) is in the atmosphere of the furnace, which means that the stacks have to be equipped with electrostatic filters for retaining the selenium present in the flue gases and the dust. Added to the already very high cost of these filtration devices is the problem of recycling the dust retained by the filters, only some of which can be reintroduced into the furnace.

Finally, selenium has a high toxicity, even at low concentration, which means that special measures are required in order to be able to handle it.

Other glass compositions have been proposed which combine iron, cobalt, nickel and titanium, as a replacement for all or part of the selenium (see EP-A-842 206, EP-A-849 233 and JP-A-200247679). The amount of titanium in the form of $TiO_2$ to be introduced into the glass remains high, from 0.7 to 2.3%.

Such glass is not advantageous from the economic standpoint as titanium is an expensive compound, which is a major contribution to the cost price of the composition. Furthermore, titanium gives windows an often undesirable yellow coloration.

Glass compositions of a low selenium content, which combine iron, cobalt and nickel, have also been described.

In EP-A-825 156 and US-A-2003/50175, the glass compositions proposed have a high iron content, varying from 1.2 to 2.2% and from 0.95 to 1.2%, respectively. The high iron content, particularly in the form of FeO, results in a reduction in heat transfers in the glass bath, resulting in lower heating efficiency of the glass in the furnace. This substantial reduction in temperature is palliated in furnaces with overhead burners by placing, for example, electrodes on the furnace floor.

In WO-A-01/58820, the low iron content (0.25 to 0.65%) allows glass compositions with a very neutral coloration to be obtained, but these are not very selective.

Finally, EP-A-653 388 describes glass compositions containing iron, cobalt and nickel, and optionally selenium. The iron content varies from 0.15 to 1.2%. According to the examples, the low selenium contents are associated with iron contents that are not overly high, less than 0.5%, giving the glass a high energy transmission.

One object of the present invention is to propose a dark gray soda-lime silicate glass composition containing no selenium, which can be used to form windows, in particular "privacy" windows for automobiles, this composition having optical properties similar to those of known compositions that contain selenium and/or titanium.

Another object of the invention is to obtain a glass composition free of selenium and titanium that can be produced under the conditions of the float process.

According to the present invention, these objects are achieved by the glass composition which includes a coloring part essentially consisting of the compounds below in contents varying within the following weight limits:

| | |
|---|---|
| $Fe_2O_3$ (total iron) | 0.7 to 0.95% |
| CoO | 50 to 80 ppm |
| NiO | 400 to 700 ppm |
| $Fe_2O_3$ (total iron) | 0.7 to 0.95% |
| CoO | 200 to 300 ppm |
| NiO | 1500 to 1900 ppm | said composition being free of selenium, having a redox of 0.40 or less, and the glass having a light transmission factor ($T_{LA}$) under illuminant A of 50% or less and an overall energy transmission factor ($T_E$) of less than 45%, these being measured for a thickness of 3.85 mm.

As indicated above, the glass falling within the scope of the present invention is gray glass, that is to say it has a transmission curve as a function of the visible wavelength that is practically invariant.

In the CIE (International Lighting Commission) system, gray substances do not have a dominant wavelength and their excitation purity is zero. By extension, any substance whose curve is relatively flat in the visible range, but which nevertheless has weak absorption bands allowing a dominant wavelength to be defined, and a low but nonzero purity, is generally accepted as being gray.

The gray glass according to the invention is consequently defined by its chromatic coordinates L*, a* and b* measured under the standard illuminant $D_{65}$ defined by the CIE, which represents average daylight having a color temperature of 6500 K, allowing the optical properties of automobile windows with a thickness of 3.85 mm to be evaluated. The glass according to the invention is defined as follows:
L* varies from 30 to 80;
a* varies from −15 to 0; and
b* varies from −20 to +25.

The use of the aforementioned coloring agents within the limits of the invention gives the desired dark gray coloration and also allows the optical and energy properties of the glass to be optimally adjusted.

The action of the colorants taken individually is in general well described in the literature.

The presence of iron in a glass composition may result from the raw materials, as impurities, or from an intentional addition with the aim of coloring the glass. It is known that iron exists in the form of ferric ($Fe^{3+}$) ions and ferrous ($Fe^{2+}$) ions. The presence of $Fe^{3+}$ ions gives the glass a slight yellow coloration and allows ultraviolet radiation to be absorbed. The presence of $Fe^{2+}$ ions gives the glass a more pronounced green-blue coloration and induces absorption of infrared radiation. The increase in iron content in both its forms increases the absorption of radiation at the extremities of the visible spectrum, this effect taking place to the detriment of light transmission. Conversely, by reducing the proportion of iron, particularly in $Fe^{2+}$ form, the performance in terms of energy transmission is degraded, while the light transmission increases.

In the present invention, the total iron content in the composition is between 0.70 and 0.95%, preferably between 0.80 and 0.95%. An iron content of less than 0.70% does not allow the intended performance to be achieved, especially because the $T_{LA}$ and $T_E$ values are too high (or the infrared selectivity is too low). Above 0.95% iron, the conditions for melting the glass composition become difficult owing to the high FeO content, which limits heat transfer.

The relatively moderate iron content used in the compositions according to the invention makes it possible, while still imparting a low energy transmission, to have an a* value that is not too high, and often close to zero, which gives the glass not too green a shade. In particular, when the glass is intended to be thermally toughened, it is beneficial to have an a* value of greater than −12, as this tends to approach 0 after toughening, which means that the glass becomes more neutral.

Cobalt produces an intense blue coloration and also decreases the light transmission. Its amount in the glass must therefore be perfectly controlled in order to make the light transmission compatible with the use for which the glass is intended. According to the invention, the cobalt oxide content varies from 50 to 80 ppm, or from 200 to 300 ppm.

Nickel oxide gives the glass a brown coloration. In the present invention, the nickel oxide content is limited so as to prevent it from being able to be combined with sulfur compounds coming from the raw materials or from other compounds intentionally added (especially sulfate as refining agent), forming nickel sulfide balls. It is in fact known that the "high temperature" phase of nickel sulfide, which is "frozen in" during thermal toughening, may progressively be transformed into a "low temperature" phase, the larger size of which induces mechanical stresses that shatter the glass, hence the risk of an accident. Thus, the nickel oxide content does not exceed 1900 ppm for reasons associated in particular with the toughening operation, as indicated in the rest of the text. According to the invention, the nickel oxide content varies from 400 to 700 ppm or from 1500 to 1900 ppm, depending on the cobalt oxide content. As a general rule, it is difficult to predict the optical and energy properties of a glass when it contains several coloring agents. These properties result in fact from a complex interaction between the various agents, the behavior of which is directly linked to their oxidation state and to the subsequent treatments (toughening, annealing, etc.) that the glass may have to undergo.

In the present invention, the choice of colorants, their content and their oxidation/reduction state is key in obtaining the intended dark gray coloration and the optical properties.

The redox defined by the ratio of the weight content of ferrous oxide (expressed as FeO) to the weight content of total iron (expressed as $Fe_2O_3$) is generally maintained at 0.40 or less, preferably of 0.30 or less, for reasons essentially associated with the melting and refining of the glass.

The redox is generally controlled using oxidizing agents such as sodium sulfate and reducing agents such as coke or calumite, the relative contents of which are adjusted in order to obtain the desired redox.

The composition according to the invention may furthermore contain less than 1%, preferably less than 0.5%, of coloring agents other than iron, cobalt and nickel, chosen from copper oxide, chromium oxide, titanium oxide, vanadium oxide and mixtures thereof.

Titanium oxide gives the glass a yellow tint and results in a reduction in the ultraviolet radiation transmission, by interacting with ferrous oxide. Consequently, its content is preferably maintained at a value below 0.5%, preferably below 0.3%. Advantageously, the glass according to the invention does not contain titanium oxide other than that introduced by way of impurity by the batch materials, corresponding to a content of less than 0.2%, or less than 0.1%, and even less than 0.05%.

Preferably, the glass composition according to the invention includes no coloring agent other than iron, cobalt and nickel.

The composition according to the invention makes it possible to obtain a glass possessing an overall light transmission factor $T_{LA}$ of 50% or less, preferably less than 40%, by and better still greater than 5%.

According to the invention, the glass has an overall energy transmission factor $T_E$ of less than 45%, preferably less than 30%.

A first series of preferred glass compositions according to the invention includes a coloring part essentially consisting of the compounds below, in the following weight limits:

| | |
|---|---|
| Fe$_2$O$_3$ (total iron) | 0.80 to 0.95% |
| CoO | 50 to 80 ppm |
| NiO | 400 to 700 ppm |
| Redox | 0.20 to 0.30. |

These compositions make it possible to obtain glass having a $T_{LA}$ value of around 30 to 45%. Such glass gives the occupants of motor vehicles equipped with it a feeling of intimacy and security.

Another series of preferred glass compositions according to the invention includes a coloring part essentially consisting of the compounds below, in the following weight limits:

| | |
|---|---|
| Fe$_2$O$_3$ (total iron) | 0.80 to 0.95% |
| CoO | 200 to 300 ppm |
| NiO | 1500 to 1900 ppm |
| Redox | 0.20 to 0.30. |

These compositions make it possible to obtain glass having a lower $T_{LA}$ value, of around 6 to 12%. Such highly tinted glass can be used for example as automobile roofs.

The term "soda-lime silicate" is used here in a broad sense and relates to any glass composition consisting of a glass matrix that comprises the following constituents (in percentages by weight):

SiO$_2$ 64-75%
Al$_2$O$_3$ 0-5%
B$_2$O$_3$ 0-5%
CaO 5-15%
MgO 0-10%
Na$_2$O 10-18%
K$_2$O 0-5%
BaO 0-5%.

It is recommended here that the soda-lime silicate glass composition may include, apart from the inevitable impurities contained especially in the batch materials, a small proportion (up to 1%) of other constituents, for example agents (SO$_3$, Cl, Sb$_2$O$_3$, AS$_2$O$_3$) that help in melting or refining the glass or that come from the optional addition of recycled cullet into the glass batch.

In the glass according to the invention, the silica content is generally maintained within narrow limits for the following reasons. Above 75%, the viscosity of glass and its ability to devitrify greatly increase, which makes it more difficult for the glass to melt and to flow on the bath of molten tin. Below 64%, the hydrolytic resistance of the glass rapidly decreases, and the transmission in the visible also decreases.

The alkali metal oxides Na$_2$O and K$_2$O facilitate melting of the glass and allow its viscosity at high temperatures to be adjusted so as to keep it close to that of a standard glass. K$_2$O can be used up to 5%, as above this the problem of the high cost of the composition arises. Moreover, the K$_2$O content may only be increased, for the most part, to the detriment of the Na$_2$O content, which helps to increase the viscosity.

The sum of the Na$_2$O and K$_2$O contents, expressed as percentages by weight, is preferably equal to or greater than 10% and advantageously less than 20%. If the sum of these contents is greater than 20% or if the Na$_2$O content is greater than 18%, the hydrolytic resistance is greatly reduced.

Alkaline-earth metal oxides allow the viscosity of the glass to be matched to the production conditions.

MgO may be used up to about 10% and its omission may be at least partly compensated for by an increase in the Na$_2$O content and/or the SiO$_2$ content. Preferably, the MgO content is less than 5% and particularly advantageously is less than 2%, which has the effect of increasing the infrared absorption capacity without impairing the transmission in the visible.

BaO allows the light transmission to be increased and it can be added to the composition with a content of less than 5%.

BaO has a much smaller effect than CaO and MgO on the viscosity of the glass and an increase in its content is essentially to the detriment of the alkaline-earth oxides, MgO and most particularly CaO. Any increase in BaO helps to increase the viscosity of the glass at low temperatures. Preferably, the glass according to the invention contains no BaO.

Apart from complying with the limits defined above for the variation in the content of each alkaline-earth metal oxide, it is preferable in order to obtain the desired transmission properties to limit the sum of the MgO, CaO and BaO percentage weight contents to a value of 15% or less.

The composition according to the invention may furthermore include additives, for example agents that modify the optical properties within certain parts of the spectrum, especially within the ultraviolet range, such as CeO$_2$, WO$_3$ and La$_2$O$_3$. The total content of these additives does not in general exceed 2% by weight of the composition, and preferably does not exceed 1%.

The glass composition according to the invention can be melted under float glass or rolled glass production conditions. The melting generally takes place in fired furnaces, optionally provided with electrodes for heating the glass through the bulk by passing an electric current between the two electrodes. To facilitate melting, and especially to make this mechanically beneficial, the glass composition advantageously has a temperature corresponding to a viscosity η such that log η=2 which is less than 1500° C. More preferably, the temperature corresponding to the viscosity η such that log η=3.5 (denoted by T(log η=3.5)) and the liquidus temperature (denoted by $T_{liq}$) satisfy the equation:

$$T(\log \eta=3.5)-T_{liq}>20° C.$$

and better still:

$$T(\log \eta=3.5)-T_{liq}>50° C.$$

The thickness of the glass sheet formed generally varies between 1 and 19 mm.

In the float process, the thickness of the ribbon obtained by sheeting out the molten glass on the tin bath preferably varies between 1 and 5 mm for automobile windows and between 3 and 10 mm for glazing intended for buildings.

By rolling, the thickness of the glass preferentially varies between 4 and 10 mm.

The glass sheet obtained by cutting the glass ribbon may subsequently undergo a bending and/or toughening operation.

Thermal toughening is a well-known operation that consists in heating the glass sheet to a temperature of around 600 to 700° C. for a time that does not generally exceed a few minutes and in suddenly cooling it, for example by pressurized air jets.

The toughened glass sheet obtained from the composition according to the invention is noteworthy in that it has a dark gray coloration characterized in particular by an a* value varying from −10 to 0 and a b* value varying from −20 to +15, preferably from −5 to +5.

It is possible to vary the dark gray coloration of the toughened glass in order to give it a tint ranging from blue to bronze by adjusting the relative amounts of the coloring agents.

If the ratio R is defined as follows:

R=[300Fe$_2$O$_3$+NiO]/[1200FeO+5CoO]

in which the Fe$_2$O$_3$ and FeO contents are expressed as percentages by weight and the NiO and CoO contents are expressed in ppm (Fe$_2$O$_3$ representing in this formula the ferric iron content), it is possible to obtain a glass having a bronze tint when the ratio R is greater than about 2.2 and a bluish tint when the ratio is less than 0.6. When the value of R lies between these limits, preferably between 0.8 and 1.5, the glass possesses a particularly advantageous neutral tint.

Under the thermal toughening conditions, the variation in the color of the glass is adjusted by the relative NiO content. It has been found that, in the toughened glass, the chemical environment of the nickel is modified, giving it different absorption properties. This results in an increase in the a* value and a decrease in that of b* and consequently a shift in the coloration of the glass toward more neutral tints. These changes are greater the higher the NiO content.

The glass sheet obtained may also undergo other subsequent treatment operations, for example for the purpose of coating it with one or more metal oxide films for the purpose of reducing its heat-up by solar radiation.

The optionally toughened glass sheet can be used as such or can be combined with another glass sheet to form laminated glazing for automobiles or buildings.

The examples of the glass compositions given below give a better appreciation of the advantages of the present invention.

In these examples, the values of the following properties calculated from experimental spectra for a glass thickness of 3.85 mm are indicated:
- the overall light transmission factor (T$_{LA}$) under illuminant A, together with the chromatic coordinates L*, a* and b* under illuminant D$_{65}$, integrated between 380 and 780 nm. These calculations are carried out taking the CIE 1931 calorimetric reference observer;
- the overall energy transmission factor (T$_E$) integrated between 295 and 2500 nm according to the ISO 9050 standard (PARRY MOON, air mass 2);
- the redox, defined as being the ratio of the mass content of ferrous iron (expressed as FeO) to the mass content of total iron (expressed as Fe$_2$O$_3$). The total iron content is measured by X-ray fluorescence and the ferrous iron content is measured using wet chemistry.

Each of the compositions given in Table 1 was produced from the following glass matrix, the contents of which are expressed in percentages by weight, this being corrected as regards silica in order to be matched to the total content of coloring agents added:
SiO$_2$ 71%
Al$_2$O$_3$ 0.70%
CaO 8.90%
MgO 3.80%
Na$_2$O 14.10%
K$_2$O 0.10%.

The glass obtained was thermally toughened by heating in a furnace at 600-700° C. for 1 to 3 minutes, and was then cooled by nozzles blasting air at a pressure of 1 bar (0.1 MPa) for 1 minute.

All the glass compositions according to the invention (examples 1 to 13) were characterized by an overall light transmission factor (T$_{LA}$) of between 5 and 50% and a dark gray coloration, these characteristics being comparable to those obtained with a glass containing selenium and/or titanium.

In particular, the glass compositions of Examples 1 and 2 are very similar in terms of light transmission and color to the known glass compositions of Examples A and B (comparative examples), respectively, used for automobile windows, although the latter have appreciable selenium contents of 10 and 30 ppm, respectively.

Examples 1, 7 and 9 to 13 illustrate a first embodiment of the invention, in which the CoO and NiO contents vary from 50 to 80 ppm and from 400 to 700 ppm, respectively. Such glass has, after thermal toughening, light transmission factors of around 30 to 45%, which allows them to be used as side or rear windows for automobiles, or as windows for buildings.

Examples 2 to 6 illustrate a second preferred embodiment of the invention, for which the CoO and NiO contents vary from 200 to 300 ppm and from 1500 to 1900 ppm, respectively, thus making it possible to obtain, after thermal toughening, glass having light transmission factors of around 6 to 12%. Owing to these low transmission values, such glass is more particularly intended for the production of automobile roofs.

TABLE 1

| | | | | | | | | Example | | | | | | | |
|---|---|---|---|---|---|---|---|---|---|---|---|---|---|---|---|
| | A | B | 1 | 2 | 3 | 4 | 5 | 6 | 7 | 8 | 9 | 10 | 11 | 12 | 13 |
| Fe$_2$O$_3$ (%) | 1.30 | 1.80 | 0.90 | 0.94 | 0.85 | 0.90 | 0.81 | 0.83 | 0.94 | 0.89 | 0.94 | 0.82 | 0.80 | 0.70 | 0.75 |
| Redox | 0.23 | 0.24 | 0.27 | 0.26 | 0.21 | 0.28 | 0.22 | 0.28 | 0.30 | 0.33 | 0.25 | 0.24 | 0.28 | 0.17 | 0.20 |
| CoO (ppm) | 90 | 300 | 70 | 230 | 290 | 300 | 280 | 250 | 76 | 60 | 52 | 65 | 50 | 70 | 60 |
| NiO (ppm) | 0 | 0 | 590 | 1590 | 1900 | 1780 | 1790 | 1650 | 690 | 530 | 690 | 610 | 550 | 520 | 520 |
| R$^{(+)}$ | | | 1.21 | 1.24 | 1.26 | 1.09 | 1.20 | 1.19 | 1.22 | 1.07 | 1.64 | 1.40 | 1.39 | 1.40 | 1.45 |
| Cr$_2$O$_3$ (ppm) | 0 | 100 | | | | | | | | | | | | | |
| Se (ppm) | 10 | 30 | | | | | | | | | | | | | |
| After toughening | | | | | | | | | | | | | | | |
| T$_{LA}$ (%) | 35.0 | 10.0 | 35.8 | 10.2 | 6.8 | 6.7 | 7.5 | 8.9 | 31.1 | 36.8 | 35.1 | 37.2 | 40.4 | 42.2 | 42.5 |
| T$_E$ | 22.0 | 8.2 | 27.4 | 15.1 | 16.3 | 12.6 | 15.6 | 14.7 | 22.7 | 24.9 | 26.5 | 30.6 | 30.6 | 41.3 | 37.7 |
| L* | 66.3 | 38.0 | 66.9 | 38.4 | 31.6 | 31.7 | 33.3 | 36.3 | 63.2 | 68.0 | 66.2 | 67.9 | 70.2 | 71.3 | 71.5 |
| a* | −7.5 | −4.3 | −7.3 | −4.0 | −2.2 | −3.2 | −2.6 | −3.6 | −8.3 | −9.0 | −7.4 | −6.5 | −7.1 | −4.6 | −5.5 |
| b* | 2.9 | 1.3 | 3.0 | 1.3 | −1.6 | −4.2 | −2.5 | −2.0 | 2.4 | 0.9 | 6.6 | 3.6 | 3.7 | 2.5 | 3.4 |

TABLE 1-continued

| | A | B | 1 | 2 | 3 | 4 | 5 | 6 | 7 | 8 | 9 | 10 | 11 | 12 | 13 |
|---|---|---|---|---|---|---|---|---|---|---|---|---|---|---|---|
| Before toughening | | | | | | | | | | | | | | | |
| $T_{LA}$ (%) | | | 38.7 | 12.3 | 8.9 | 8.7 | 9.7 | 11.3 | 34.4 | 39.7 | 38.8 | 40.6 | 43.7 | 45.5 | 45.8 |
| $T_E$ | | | 28.0 | 15.4 | 17.1 | 13.3 | 16.5 | 15.6 | 23.9 | 25.9 | 27.6 | 31.7 | 31.7 | 42.4 | 38.8 |
| L* | | | 69.1 | 42.2 | 36.1 | 35.9 | 37.7 | 40.6 | 65.9 | 70.1 | 68.9 | 70.3 | 72.5 | 73.5 | 73.7 |
| a* | | | −9.8 | −8.4 | −6.6 | −7.9 | −7.1 | −8.0 | −10.7 | −10.9 | −9.5 | −8.6 | −9.0 | −6.4 | −7.2 |
| b* | | | 5.6 | 6.2 | 5.7 | 2.6 | 4.6 | 4.8 | 6.3 | 4.0 | 10.6 | 7.2 | 7.1 | 5.8 | 6.7 |

$R^{(+)} = [300Fe_2O_3 + NiO]/[1200FeO + 5CoO]$

The invention claimed is:

1. A selenium-free gray soda-lime silicate glass having a redox of 0.40 or less, a light transmission factor ($T_{LA}$) under illuminant A of 50% or less, and an overall energy transmission factor ($T_E$) of less than 45%, wherein the $T_{LA}$ and $T_E$ are measured at a glass thickness of 3.85 mm, comprising:
a coloring component comprising:

| | |
|---|---|
| $Fe_2O_3$ (total iron) | 0.7 to 0.95%, |
| CoO | 50 to 80 ppm, and |
| NiO | 400 to 700 ppm. |

2. The glass of claim 1, wherein the redox does not exceed 0.30.

3. The glass of claim 1, wherein the light transmission factor under illuminant A, $T_{LA}$, is greater than 5%.

4. The glass of claim 1, wherein the overall energy transmission factor $T_E$ is less than 30%.

5. The glass of claim 1, further comprising 1% or less of coloring agents selected from the group consisting of copper oxide, chromium oxide, titanium oxide, vanadium oxide and mixtures thereof.

6. The glass of claim 5, wherein the titanium oxide content is less than 0.5.

7. The glass of claim 1, which comprises coloring agents:

| | |
|---|---|
| $Fe_2O_3$ (total iron) | 0.80 to 0.95% |
| CoO | 50 to 80 ppm, and |
| NiO | 400 to 700 ppm; | which has a redox of 0.20 to 0.30 and a light transmission factor under illuminant A ($T_{LA}$) of around 30 to 45%.

8. The glass of claim 1, comprising the following constituents (in percentages by weight):

$SiO_2$ 64-75%
$Al_2O_3$ 0-5%
$B_2O_3$ 0-5%
CaO 5-15%
MgO 0-10%
$Na_2O$ 10-18%
$K_2O$ 0-5%, and
BaO 0-5%.

9. A glass sheet comprising the glass of claim 1 which is formed by the float process on a bath of molten metal.

10. The glass sheet of claim 9, which has the following chromatic coordinates measured under illuminant $D_{65}$, for a thickness of 3.85 mm:
L* varies from 30 to 80
a* varies from −15 to 0
b* varies from −20 to 25.

11. A thermally toughened glass sheet comprising the glass of claim 1 having the following chromatic coordinates measured under illuminant $D_{65}$, for a thickness of 3.85 mm:
a* varies from −10 to 0
b* varies from −20 to +15, preferably from −5 to +5.

12. The glass sheet of claim 9, further comprising at least one layer of at least one metal oxide for reflecting infrared radiation.

13. A window comprising at least one glass sheet of claim 9.

14. The selenium-free gray soda-lime silicate glass of claim 1, wherein said coloring component consists essentially of:

| | |
|---|---|
| $Fe_2O_3$ (total iron) | 0.7 to 0.95%, |
| CoO | 50 to 80 ppm, and |
| NiO | 400 to 700 ppm. |

* * * * *